United States Patent
Enke (10) Patent No.: US 9,853,969 B2
(45) Date of Patent: Dec. 26, 2017

(54) BLUETOOTH LOW ENERGY HOSTLESS PRIVATE ADDRESS RESOLUTION

(71) Applicant: GoPro, Inc., San Mateo, CA (US)

(72) Inventor: Joseph Anthony Enke, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 117 days.

(21) Appl. No.: 14/864,793

(22) Filed: Sep. 24, 2015

(65) Prior Publication Data

US 2016/0099936 A1 Apr. 7, 2016

Related U.S. Application Data

(60) Provisional application No. 62/058,655, filed on Oct. 1, 2014.

(51) Int. Cl.
| | |
|---|---|
| H04L 29/06 | (2006.01) |
| H04W 4/00 | (2009.01) |
| H04W 8/26 | (2009.01) |
| H04W 48/16 | (2009.01) |
| H04W 52/02 | (2009.01) |

(Continued)

(52) U.S. Cl.
CPC ...... *H04L 63/0853* (2013.01); *H04L 63/0428* (2013.01); *H04W 4/008* (2013.01); *H04W 8/005* (2013.01); *H04W 8/26* (2013.01); *H04W 48/16* (2013.01); *H04W 52/0206* (2013.01); *H04W 76/02* (2013.01); *H04L 63/06* (2013.01); *Y02B 60/50* (2013.01)

(58) Field of Classification Search
CPC ................................. H04L 63/0876
USPC ........................................................ 713/170
See application file for complete search history.

(56) References Cited

U.S. PATENT DOCUMENTS 9,380,119 B2 * 6/2016 Kasslin ................... H04L 67/16
2009/0210519 A1 8/2009 Zill et al.
(Continued)

FOREIGN PATENT DOCUMENTS

| EP | 2645665 A1 | 10/2013 |
|---|---|---|
| WO | WO 2006/036093 A1 | 4/2006 |

OTHER PUBLICATIONS

PCT International Search Report and Written Opinion for PCT/US2015/052742, dated Dec. 17, 2015, 29 Pages.
(Continued)

*Primary Examiner* — Longbit Chai
(74) *Attorney, Agent, or Firm* — Fenwick & West LLP (57) ABSTRACT

Conventional Bluetooth low energy (or like personal wireless network) controllers cannot resolve private addresses without some calculation from a host processor but leaving the host processor on or awaking it from a sleep each time a non-trusted device attempts to connect wastes power. Hostless private address resolution allows a host controller to enter a sleep state off while the Bluetooth controller advertises its device name, primary services, rejects connection requests from non-trusted devices with public and private addresses, and awakens the host controller upon a connection request from a trusted client device with a public or private address. Not only does this approach reduce power consumption by allowing the host processor to remain in the sleep state it simultaneously ensures security by allowing the private address resolution to remain active on the Bluetooth controller.

22 Claims, 4 Drawing Sheets

(51) Int. Cl.
*H04W 76/02* (2009.01)
*H04W 8/00* (2009.01)

(56) References Cited

U.S. PATENT DOCUMENTS

| | | |
|---|---|---|
| 2012/0213136 A1 | 8/2012 | Woo et al. |
| 2012/0278882 A1 | 11/2012 | Lydon et al. |
| 2013/0003632 A1 | 1/2013 | Salomone et al. |
| 2013/0188538 A1* | 7/2013 | Kainulainen ............. G01S 3/48 370/310 |
| 2014/0028818 A1 | 1/2014 | Brockway, III et al. |
| 2014/0057567 A1 | 2/2014 | Desai et al. |
| 2014/0109222 A1* | 4/2014 | Yang .................. H04L 63/1425 726/22 |
| 2016/0066184 A1* | 3/2016 | Bhargav-Spantzel .. G06F 21/40 726/7 |

OTHER PUBLICATIONS

Gomez, C., et al., "Overview and Evaluation of Bluetooth Low Energy: An Emerging Low-Power Wireless Technology," Sensors, 2012, pp. 11734-11753, vol. 12.

Bluetooth, "Specification of the Bluetooth System," Architecture & Terminology Overview, Covered Core Package version 4.0, Specification vol. 1, Bluetooth, Jun. 30, 2010, 137 pp.

Supplementary European Search Report for European Patent Application No. Ep 15847373, Sep. 8, 2017, 9 pp.

* cited by examiner

FIG. 4

BLUETOOTH LOW ENERGY HOSTLESS PRIVATE ADDRESS RESOLUTION

CROSS REFERENCE TO RELATED APPLICATIONS

This application claims the benefit of U.S. Provisional Application No. 62/058,655, filed Oct. 1, 2014, the content of which is incorporated by reference in its entirety.

BACKGROUND

Field of Art

The disclosure generally relates to the field of hostless address resolution.

Description of the Related Art

Bluetooth is a short-ranged, low-powered, protocol standard that transmits data wirelessly over radio links. It was developed as a serial cable replacement technology between digital devices such as keyboards, laptops, mice, mobile cellular devices, and audio headsets. When such devices are connected in a short range wireless network they are considered to be in a personal area network (PAN). Devices in these networks connect to each other with little user input and tend remain constantly connected. While convenient for the user, minimal input and constant connection is achieved at the cost of security and power consumption. Bluetooth allows two devices to automatically synchronize and communicate after each of the devices is paired with a user inputted passkey. The passkey, a random number, and a public address of a connecting device are used to authenticate a connection. This approach is vulnerable to device tracking and can leave Bluetooth devices open to electronic eavesdropping and man in the middle attacks. Constant connections are used for Bluetooth devices that require a high throughput such as audio headsets and mobile devices. This is practical for devices that are charged frequently and have a high energy ceiling but not for devices that use smaller, low capacity batteries.

The Bluetooth 4.0 specification redirected its development away from increasing throughput to dramatically reducing power consumption. This refocusing arose from the need to service devices that are connected to body area networks that required ultra-low power consumption. Thermometers, glucose meters, blood pressure monitors, heart rate monitors, smart watches, tire pressure sensors, motions exemplify devices with the requirement for ultra-low power consumption. These devices use batteries that necessitate lower peak current and lower average current consumption in order to maintain an energy lifetime from a few months to a couple years. To achieve a lower power profile, Bluetooth Low Energy devices reduced power consumption by reducing throughput. Bluetooth Low Energy devices remain functionally off most of the time, awaking only to occasionally send short burst data packets. Shorter data packets reduce the connection time and the time a broadcasting radio needs to remain in a high power state. Power consumption was also reduced was by lessening Bluetooth functionality. This in turn lowered the dynamic memory and its constant current supply required to maintain a memory state. With the incorporation of body area devices arose the need to increase security since users tend to carry devices on their person. Using a public address makes it relatively simple to track devices and the person using them. Bluetooth Low Energy addressed this need with the introduction of private addresses resolution on a host processor, however, the host processor needs to remain powered on or awoken each time an unknown device attempts to connect. This causes an unnecessary increase in power consumption. Therefore there is a lacking mechanism to provide for private address resolution used in Bluetooth Low Energy devices that does not require operation for the host processor.

The figures depict various embodiments for purposes of illustration only. One skilled in the art will readily recognize from the following discussion that alternative embodiments of the structures and methods illustrated herein may be employed without departing from the principles disclosed herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that me employed without departing from the principles described herein.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Configuration Overview

Figure 1:
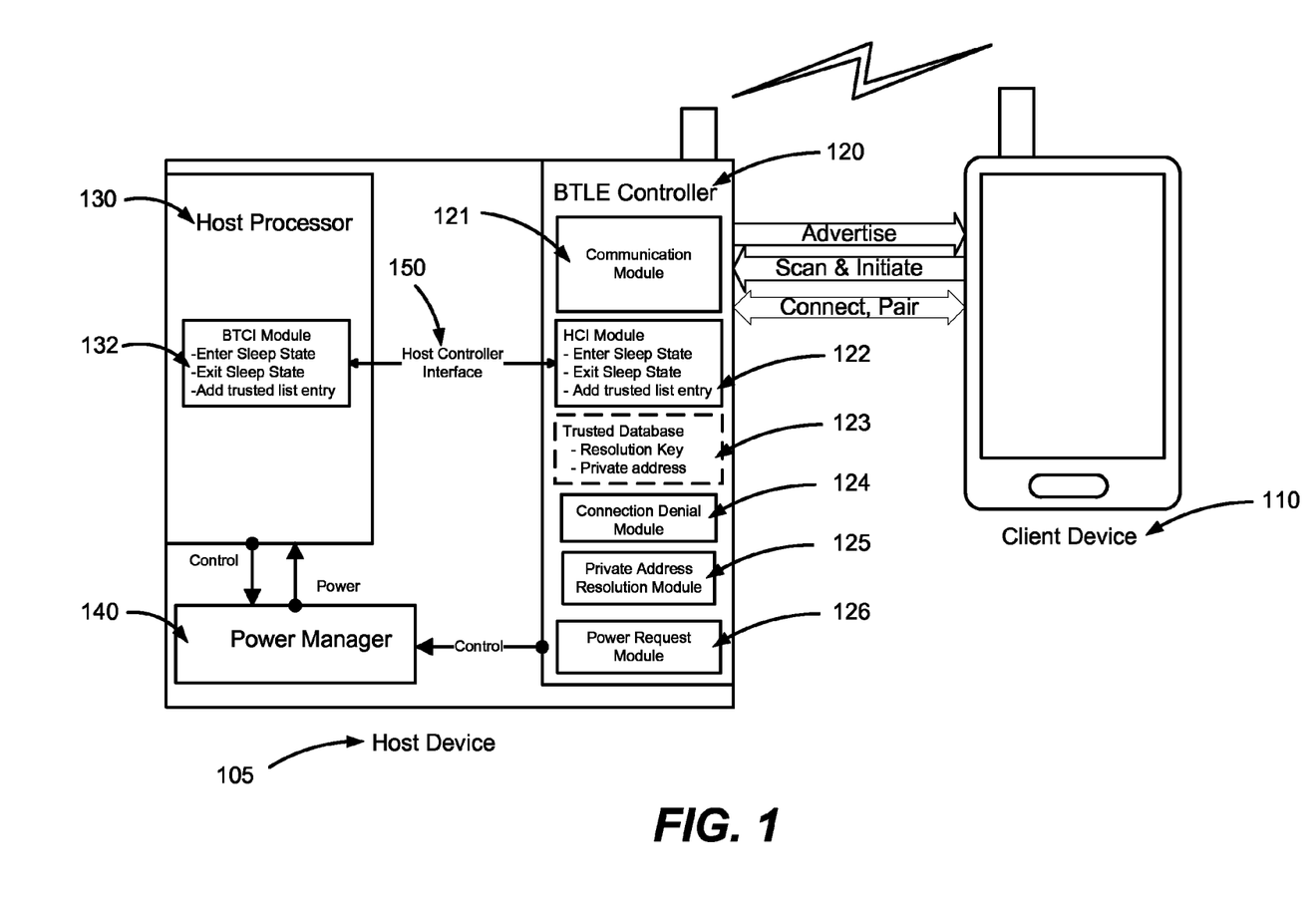
FIG. 1 illustrates one embodiment of a Bluetooth Low Energy host architecture and functionality.

FIG. 1 is a diagram illustrating functionality of a Bluetooth Low Energy (BLTE) host device 105 with hostless private address resolution and a client device 110. The BTLE is a particular wireless personal area network. Both the host device 105 and the client device 110 include conventional computing system components such as one or more processors, a memory, a storage device, and network interfaces. The memory and storage device can store instructions corresponding to processes and modules as further described below that are executable by a processor.

The host device 110 includes a Bluetooth Low Energy (or like personal wireless network) controller 120, a host processor 130, a power manager 140, and a host controller interface 150. The host device 105 may be any suitable hand-held computerized device, such as a camera, tablet, smart phone, and other systems including components for performing the described actions. Accordingly, the host device 105 may include various additional features, modules, and elements according to various embodiments. The host device 105 communicates wirelessly to the client device 110. The client device 110 may include a Bluetooth controller or a Bluetooth Low Energy controller to communicate with the Bluetooth Low Energy controller 120 of the host device 105. The client device 110 may also include various additional features, modules and elements according to various embodiments.

The Bluetooth Low Energy controller 120, in one embodiment, is firmware implemented on an integrated circuit. The Bluetooth Low Energy controller 120 encapsulates the protocols needed to interface between the host processor 130 and a connecting client device 110. The Bluetooth Low Energy controller 120 contains a communication module 121, host controller interface (HCI) module 122, trusted database 123, connection denial module 124, a private address resolution module 125, and a power management module 126. In this embodiment the trusted database 123, connection denial module 124, private address resolution module 125, and power management module 126 have been placed in the Bluetooth Low Energy controller 120 to allow for hostless private address resolution while remaining compliant with the Bluetooth 4.0 specification.

The communication module 121 allows for packet exchanges between Bluetooth Low Energy devices. The communication module 121 broadcast advertising packets that inform Bluetooth enabled devices a connection is available. The communication module 121 may also advertise that it has information available to send. For example, a pedometer may advertise its connective availability and that it has recorded distance data ready to transmit. A connecting client device 110 is able to scan data packets from the advertising host device 105. The scanner may request additional information before initiating a connection. An example of a scan and initiation may be where a client device 110 is listening for advertising packets from a pedometer and initiating a connection for transfer of data. A connection may be initiated from either the advertising device or the initiating device. It is not until a data packet is exchanged is the connection established.

Figure 2:
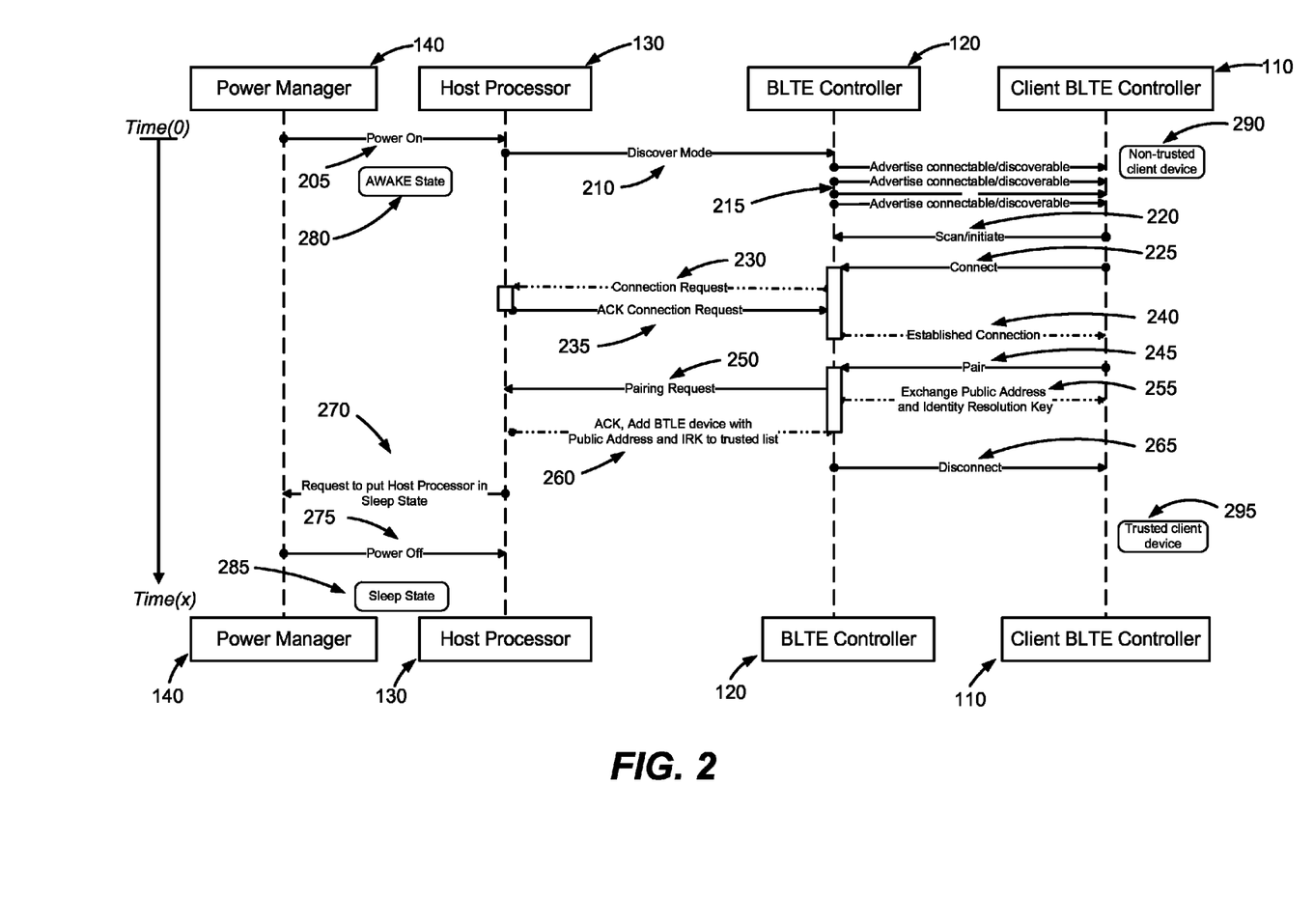
FIG. 2 illustrates a sequence in which a non-trusted client device becomes a trusted client device.

The host controller interface module 122 contains functionality that synchronizes the power state and trusted database entries of the host processor 130 with the Bluetooth Low Energy controller 120. The host controller interface module 122 may initiate an awake state 280 for the host processor 130 by sending an awake state signal to a Bluetooth controller interface (BTCI) module 132, found in the host processor 120. It simultaneously sends a request for a power on 275 to the power manager 140 via a power management module 126. The Bluetooth controller interface module 132 may then send a status signal to the host controller interface module 122 indicating it is entering an awake state 280. In addition to directing the awake state 280 of the host processor 130, the host controller interface module 122 may add 415 a public addresses and identity resolution keys to a trusted database 123 when the host processor 130 is in an awake state 280. The host controller interface module 122 cannot add 415 public addresses and identity resolution keys of its own accord, it must receive them from the Bluetooth controller interface module 132. The adding 415 of public addresses and identity keys occurs after a pairing 245 between a host device 105 and a connecting client device 110. Adding 415 public addresses and identity resolution keys to a trusted database allow the host device 105 to achieve private address resolution with the host processor 130 in the sleep state 285.

The trusted database 123 is a data structure that stores public address and identity resolution key entries. The trusted database 123 works in conjunction with a connection denial module 124 to filter untrusted devices. The trusted database 123 responds to scan and connection request only for client devices 110 listed in the trusted database 123.

Devices not on the trusted database 123 are either denied connections request 320 or have their scan request 220 ignored by the connection denial module 124. The trusted database 123 and connection denial module 124 are located in the Bluetooth Low Energy controller 120. This gives the Bluetooth Low Energy controller 120 ability to resolve private addresses when the host processor in the sleep state 285.

The private address resolution module 125 allows the Bluetooth Low Energy controller 120 to resolve private addresses without communicating with the host processor 130. The function resolves or authenticates private addresses of connecting client devices 110 located within the trusted database 123. By adding private addressing to the Bluetooth Low Energy protocol, device tracking can be prevented. An identity resolution key is a 128-bit key used to generate and resolve private addresses. To deter device tracking, a different private address can be generated as many times as necessary using a random number generator, identity resolution key, and a public address of the connecting client device 110. The identity resolution key and public address are exchanged during a pairing process 245 between the connecting client device 110 and the host device 105. The private address resolution module 125 receives the identity resolution key and a private address from the connecting client device 110 for decryption. If the result of the decryption matches the public address in the trusted database 123 an authentication is granted. If the connecting client device 110 is not on the trusted database 123 a connection is denied by connection denial module 124.

The power request module 126 is an interface between the host controller interface module 122 and the power manager 140. The power request module 126 receives, from the host controller interface module 122, a request from the host processor 130 to enter an awake state 280. The power request module 126 relays thereafter power on request to the power manager 140.

The host processor 130 is the main processing unit for the host device 105. The host processor 130 may store data in memory, communicate to peripherals over communication interfaces and/or busses, perform signal and/or image processing, process data wirelessly over a network, and/or perform other instruction processing. The host processor 130 executes the upper layers of the Bluetooth Low Energy protocol and contains the host controller interface module 132 which is used to communicate with the Bluetooth Low Energy controller 120. In various embodiments the host processor 130 is an application processor or a microcontroller.

The Bluetooth controller interface module 132, located on the host processor 130, is functionally similar to the host controller interface module 122 on the Bluetooth Low Energy controller 120. The Bluetooth controller interface module 132 may command the host processor 130 to enter the sleep state 285 while sending sleep status signals to the host controller interface module 122. The Bluetooth controller interface module 132 may transition the host processor 130 from an awake state 285 to a sleep state 280 by responding to a power off signal from the power manager 140. Additionally, the Bluetooth controller interface module 132 adds 415 public addresses and identity resolution keys to the trusted database 123 generated on the Bluetooth Low Energy controller 120 after a pairing 245 between a host device 105 and a connecting client device 110. If the host processor 130 is reset the Bluetooth controller interface module 132 initializes the list of trusted client devices stored in the trusted database 123.

The power manager 140 is an integrated circuit that governs the power state of the host processor 130. The power manager 140 receives request to power off or request to power on 205 the host processor 130 from the Bluetooth Low Energy controller 120 or the host processor 130. Once a request is received to change the power state of the host processor 130, the power manager 140 sends a power on 205 signal or power off 275 signal to the host processor 130. The power manager 140 does not initiate power sequencing on its own accord.

The host controller interface 150 is a communication interface between the host processor 130 and the Bluetooth Low Energy controller 120. The host processor 130 and Bluetooth Low Energy controller 120 operate at different levels of protocol abstraction; the host controller interface 150 bridges this gap and standardizes message packets. The host controller interface 150 may be implemented in communication busses such as universal asynchronous receiver/transmitter (UART), serial peripheral interface (SPI), Universal serial bus (USB). The host controller interface 150 may also be implemented as firmware logic on the same processor as the host processor 130 or the Bluetooth Low Energy controller 120.

Turning now to FIG. 2, it illustrates a sequence in which a non-trusted client device 290 becomes a trusted client device 295. A trusted client device 295 is a device that has been authenticated with its device specific private address. To become a trusted device 295 the host processor 130 is first powered on 205 and in an awake state 280. The host processor 130 sends a signal to the Bluetooth Low Energy controller 120 to enter the discover mode state 210. The discover mode state 210 allows the host device 105 to advertise 215 its capabilities, search for other Bluetooth enabled devices, and establish a connections.

A non-trusted client device 290 enters the discover mode state 210 to become a trusted client device 295. Once in the discover mode state 210 the Bluetooth Low Energy controller 120 may advertise 215 its availability, its capabilities, and respond to scan and initiate 220 requests from a non-trusted client device 290. A connection 225 occurs when the non-trusted client device 290 responds to an advertisement from the Bluetooth Low Energy controller 120. After a connection the Bluetooth Low Energy controller 120 passes the connection request 230 to the host processor 130. The host processor 130 responds with an acknowledge connection request 235 and a data packet is sent to the non-trusted client device 290 creating an established connection 240.

Once a connection has been established between a host device 105 and a non-trusted client device 290, the pairing 245 process can be initiated. Pairing 245 is a process in which two devices are associated with each other. The pairing 245 process may be initiated by the non-trust client device 290. The pairing request 250 is received by the Bluetooth Low Energy controller 120 and passed to the host processor 130 for approval. When two devices, e.g. host device 105 and client device 110, pair 245 in this process, a passkey or personal identification number is exchanged to establish a connection in which security keys and addresses can be exchanged 255. The identity resolution key and public address of the non-trusted client device 290 are exchanged 255 and added 260 to the trusted database 123 by the host processor 130. A disconnect 265 command is issued from the Bluetooth Low Energy controller 120 to disconnect 265 from the non-trusted client device 290. At this point the non-trusted client device 290 becomes a trusted client device 295. The host processor 130 is then put in a sleep state 285 to reduce power consumption. A command, request sleep state 270 is issued from the Bluetooth Low Energy controller 120 to the power manager 140. The power manager 140 sends a power off 275 signal and the host processor 130 enters the sleep state 285 and are now securely pair with each other.

Figure 3:
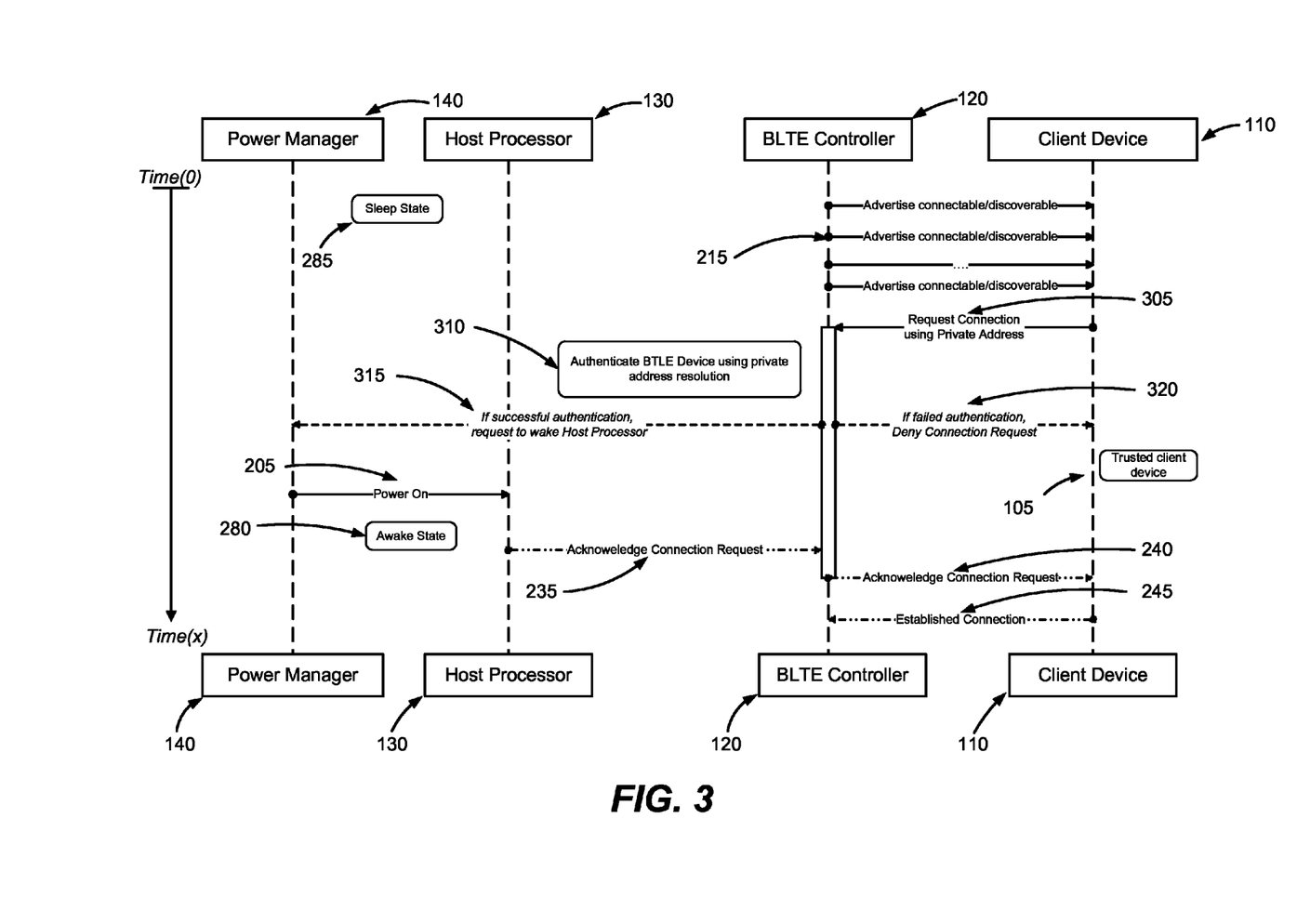
FIG. 3 illustrates a sequence in which hostless private address resolution is performed for a trusted and non-trusted client device.

FIG. 3 illustrates a sequence in which a hostless private address resolution is performed for a connecting client device 110. The host processor 130, in order to reduce power consumption, remains in the sleep state 285 and is unable to communicate with the Bluetooth Low Energy controller 120. The Bluetooth Low Energy controller 120 advertises 215 its availability, its services, and responds to scan and initiate 220 requests from a connecting client device 110. At this point the trustworthiness of the connecting client device 110 is not known and will not be known until an authentication 310 process occurs. The connecting client device 110 requests a connection using a private address 305. The private address 305 is received by the Bluetooth Low Energy controller 120 of the host device 105 and routed into the private address resolution module 125, described in FIG. 1. If the result of the private address resolution matches the public address in the trusted database 123 then the authentication is successful 315 and the power manager 140 is sent a request to wake the host processor 315. The power manager 140 sends a power on 205 signal to the host processor 130 and the host processor enters the awake state 280. An acknowledge connection request 235 is sent from the host processor 130 to the Bluetooth Low Energy controller 120. The Bluetooth Low Energy controller 120 transmits the acknowledge connection request 235 to what can now be a trusted client device 295. The acknowledge connection request 235 is received by the trusted client device 295 and it sends a data packet to the host device 105 establishing a connection 240. Once a connection is established, the host device 105 and the trusted client device are free to communicate as needed. If the result of the private address 305 resolution does not match the public address in the trusted database 123 then the connection denial module 124 issues a deny connection request 320 to the connecting client device 110.

Figure 4:
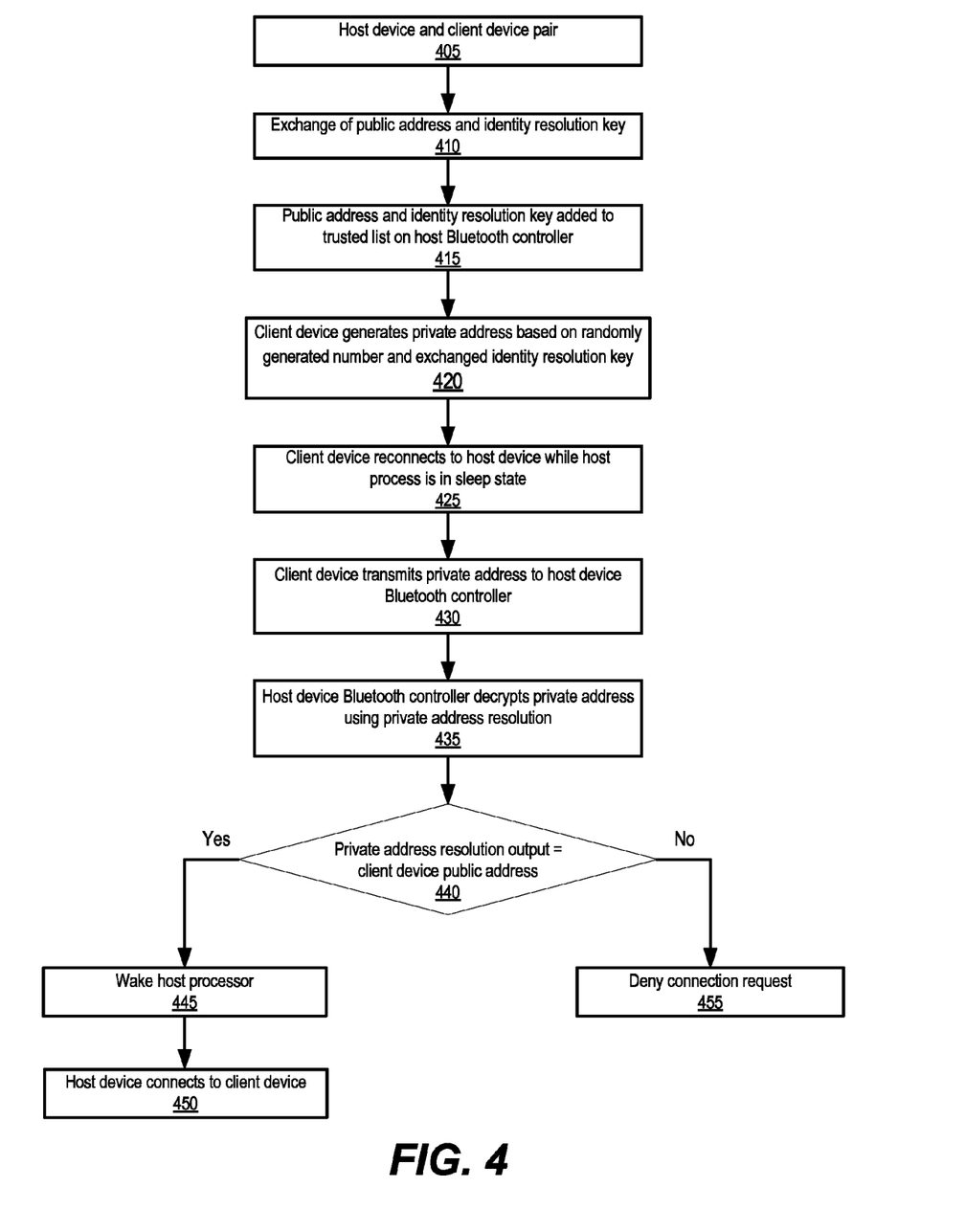
FIG. 4 is a flow chart illustrating pairing and hostless private address resolution between a host and client device.

FIG. 4 is a flow chart illustrating pairing and hostless private address resolution between a host device 105 and client device 110. The host device 105 and the client device 110 must pair 405 before a private address can be resolved while the host processor 130 is in the sleep state 285. Once a pair 405 occurs both devices exchange public addresses and identity resolution keys 410. The host device 105 stores 415 the public address and identity resolution key in the trusted database 123 for later authentication. The connecting client device 110 generates 420 a private address using the exchanged identity resolution key and a randomly generated number. The host processor 130, after adding 415 the public address and identity resolution key to the trusted database 123, may be put into the sleep state 285. If the host processor 130 is in the sleep state 285 and the connecting client device 110 reconnects 425, the connecting client device 110 must transmit 430 its private address to the Bluetooth Low Energy controller 120. In order to resolve the private address while the host processor 130 is in the sleep state 285, the Bluetooth Low Energy controller decrypts 435 the private address of the connecting client device 110. If the output 440 of the private address resolution is equal to the public address of the connecting client device 110 the host processor 130 is awoken 445 and in the awake state 280. The host device 105 is then connected 450 to the client device 110. If the private address resolution output 440 is not equal to the public address the connection is denied 455.

Additional Configuration Considerations

Hostless private address resolution allows a host controller to enter a sleep state off while the Bluetooth Controller performs functions that are typically done by the host controller. Advertising the device name, primary services, rejecting connection requests from non-trusted devices, awaking the host controller upon a connection request from a trusted client device with a public or private address. This approach reduces power consumption by allowing the host processor to remain in the sleep state it and simultaneously ensures security by allowing the private address resolution to remain active on the Bluetooth controller.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, 3, and 4. Modules may constitute either software modules (e.g., instructions or programs, code embodied on a machine-readable medium as described with FIG. 1) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for hostless private address resolution through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of enabling private address resolution using a wireless personal area network controller when a host processor is in a sleep state, the method comprising:
    establishing a connection with at least one client device receiving a broadcast of the host processor name, the connection allowing an exchange of a public address and an identity resolution key for each device;
    generating a trusted database comprising the public address and the corresponding identity resolution keys for the at least one connected devices, the trusted database corresponding to trusted client devices for a connection between a trusted client device in the trusted database and a host processor;
    storing the trusted database in a memory associated with the wireless personal area network controller;
    receiving, by the wireless personal area network controller, a connection request from a trusted client device while the host processor is in the sleep state, the connection request including a resolvable private address and identity resolution key of the trusted client device;
    obtaining a corresponding public address for the trusted client device based on the resolvable private address and the identity resolution key received from the connection request and identifying the obtained corresponding public address stored in the trusted database which is used to authenticate the client device; and
    waking, in response to client device being authenticated, the host processor to connect with the trusted client device.

2. The method of claim 1, wherein the public address and of the client device is not stored in the trusted database, disallowing the trusted client device from connecting with the host processor.

3. The method of claim 1, wherein establishing a connection with at least one client device further comprises:
    broadcasting a device name associated with the host processor;
    establishing a pair with the client device seeking to be in the trusted database;
    storing the public address and the identity resolution key in the trusted database, the client device thereafter becoming a trusted client device.

4. The method of claim 1, wherein generating an authentication further comprises:
    decrypting the resolvable private address using identity resolution key provided by the trusted client device;
    comparing the decryption result to the public address associated with the trusted client device stored in the trusted database;
    granting authentication if the decryption result matches the public address stored in the trusted database; and
    denying authentication if the result does not match the public address stored in the trusted database.

5. The method of claim 1, wherein in response to the request to the wake the host processor further comprises:
    transmitting, by a power management module, the awake request to the power manager; and
    receiving, by the power manager, in response to receiving the awake request, powering on the host processor.

6. The method of claim 1, wherein in generating a trusted database further comprises:
    generating of a trusted database data structure on a controller memory of the wireless personal area network controller;
    initializing a list of trusted client devices at a time of host processor reset;
    storing the public addresses and identity resolution key entries of trusted client devices on the controller memory of the wireless personal area network controller; and
    allowing scan and connect request from trusted client devices.

7. The method of claim 1, wherein in a resolvable private address received by the host device is generated with the exchanged public address and identity resolution key.

8. A wireless personal area network enabled host device, comprising:
    a host processor;
    a wireless personal area network controller;
    an interface configured to allow communication between the wireless personal area network controller and the host processor;
    a communication module configured to establish the connection between at least one client device receiving a broadcast of the host processor name, the connection allowing the exchange of a public address and an identity resolution key for each device;
    a power manager configured to control the power state of the host processor;
    a trusted database stored on the memory of wireless personal area network controller configured to store the public addresses and the corresponding identity resolution keys for the at least one client device, the trusted database corresponding to trusted client devices; and
    a software module, stored in memory of the wireless personal area network controller, configured to
        receive the private address and the identity resolution key of a trusted client device while the host processor is in a sleep state, and obtain a corresponding public address for the trusted device based on the received private address and identity resolution key, wherein the obtained corresponding public address is stored in the trusted database and is used to authenticate the client device.

9. The host device of claim 8, wherein the trusted database is further configured to respond to connection request from trusted client devices listed in the trusted database.

10. The host device of claim 8, wherein the communication module is further configured to:
broadcast advertising packets that indicate the discoverability of the host device;
advertise an availability of data ready for transmission; and
acknowledge connection request of client devices.

11. The host device of claim 8, wherein the plurality of modules includes a host controller interface module configured to:
synchronize a memory state of the trusted database with the host processor;
add public addresses and identity resolution keys to the trusted database; and
synchronize a power state of the Bluetooth Low Energy controller with the host processor.

12. The host device of claim 8, wherein the plurality of modules includes a private address resolution module configured to:
decrypt the identity resolution key and private address; and
compare the result of the decryption to an associated public address of the client device in the trusted database.

13. The host device of claim 8, wherein the plurality of modules includes a connection denial module configured to:
deny connection and scan request by client devices not listed in the trusted database; and
deny a connection request by a trusted client device if the result of the decryption does not match the associated public address listed in the trusted database.

14. The host device of claim 8, further comprising a host controller interface module configured to send a host processor awake request to the power manager.

15. The host device of claim 8, wherein the device is a camera.

16. A non-transitory computer readable storage medium storing instructions to enable private address resolution using a personal wireless network controller when a host processor is in a sleep state, the instructions comprising instructions that cause a processor to:
establish a connection with at least one client device receiving a broadcast of the host processor name, the connection allowing an exchange of a public address and an identity resolution key for each device;
generate a trusted database corresponding comprising the public address and the corresponding identity resolution keys for the at least one connect devices, the trusted database corresponding to trusted client devices for a connection between a trusted client device in the trusted database and a host processor;
store the trusted database in a data store associated with the personal wireless network controller;
receive, by the personal wireless network controller, a connection request from a trusted client device while the host processor is in the sleep state, the connection request including a resolvable private address and identity resolution key of the trusted client device;
obtain a corresponding public address for the trusted client device based on the resolvable private address and the identity resolution key received from the connection request and identifying the obtained corresponding public address stored in the trusted database which is used to authenticate the client device; and
wake, in response to connecting device being authenticated, the host processor to connect with the trusted client device.

17. The computer readable storage medium of claim 16, further comprising instructions that when executed cause the personal wireless network controller, in response to the public address of the trusted client device not being in the trusted database, disallow the trusted client device from connecting with the host processor.

18. The computer readable storage medium of claim 16, further comprising instructions that when executed cause the host device to:
broadcast a device name associated with the host processor;
establish a pair with the client device seeking to be in the trusted database;
store the public address and the identity resolution key in the trusted database, the client device thereafter becoming a trusted device.

19. The computer readable storage medium of claim 16, further comprising instructions that when executed cause the personal wireless network controller to:
decrypt the private address and identity resolution key of the trusted client device;
compare the decryption result to the public address associated with the trusted client device stored in the trusted database;
grant authentication if the decryption result matches the public address stored in the trusted database; and
deny authentication if the decryption result does not match the public address stored in the trusted database.

20. The computer readable storage medium of claim 16, further comprising instructions that when executed cause the personal wireless network controller to send an awake request to the power manager.

21. The computer readable storage medium of claim 16, further comprising instructions that when executed cause the power manager to receive, in response to receiving the awake request, power on the host processor.

22. The computer readable storage medium of claim 16, further comprising instructions that when executed cause the host processor to:
generate of trusted database data structure on a controller memory of the personal wireless network controller; initialize of a list of trusted client devices at the time of host processor reset; store the public addresses and identity resolution key entries of the trusted client device on the controller memory of the personal wireless network controller; and allow scan and connect request from trusted client devices.

* * * * *